(12) United States Patent
Ogata et al.

(10) Patent No.: US 6,261,329 B1
(45) Date of Patent: Jul. 17, 2001

(54) DIAMOND SINTERED BODY HAVING HIGH STRENGTH AND HIGH WEAR RESISTANCE, AND TOOL INCLUDING THE SAME

(75) Inventors: Yasunobu Ogata; Satoru Kukino; Yasuyuki Kanada; Junichi Shiraishi; Tetsuo Nakai, all of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/367,248

(22) PCT Filed: Dec. 14, 1998

(86) PCT No.: PCT/JP98/05649

§ 371 Date: Aug. 10, 1999

§ 102(e) Date: Aug. 10, 1999

(87) PCT Pub. No.: WO99/43630

PCT Pub. Date: Sep. 2, 1999

(30) Foreign Application Priority Data

Feb. 26, 1998 (JP) .................................................. 10-045468

(51) Int. Cl.$^7$ ............................. C22C 1/05; C22C 26/00; C04B 35/52; B24D 3/04
(52) U.S. Cl. ................................. 51/309; 51/307; 51/293; 51/295; 419/11; 419/18; 419/14; 428/551; 75/237; 75/238; 75/240; 75/241; 75/242; 75/243
(58) Field of Search ............................. 51/293, 307, 309, 51/295; 407/119; 75/237, 238, 240, 241, 242, 230, 243; 419/14, 11, 18; 428/323, 698, 699, 704, 551

(56) References Cited

U.S. PATENT DOCUMENTS

| | | | |
|---|---|---|---|
| 3,745,623 | | 7/1973 | Wentorf, Jr. et al. . |
| 4,610,699 | * | 9/1986 | Yazu et al. .............................. 51/309 |
| 4,636,253 | * | 1/1987 | Nakai et al. ........................... 75/243 |
| 5,759,216 | * | 6/1998 | Kanada et al. ......................... 51/309 |
| 6,013,117 | * | 1/2000 | Ederyd ................................... 51/309 |

FOREIGN PATENT DOCUMENTS

| | | | |
|---|---|---|---|
| 155066 | * | 9/1985 | (EP) . |
| 0714695 | | 6/1996 | (EP) . |
| 39-20483 | | 9/1964 | (JP) . |
| 52-12126 | | 4/1977 | (JP) . |
| 57-56381 | | 4/1982 | (JP) . |
| 57-82176 | | 5/1982 | (JP) . |
| 58-32224 | | 7/1983 | (JP) . |
| 61-58432 | | 12/1986 | (JP) . |
| 63-134565 | | 6/1988 | (JP) . |
| 5-105910 | | 4/1993 | (JP) . |
| 8-225875 | | 9/1996 | (JP) . |

* cited by examiner

Primary Examiner—Michael Marcheschi
(74) Attorney, Agent, or Firm—W. F. Fasse; W. G. Fasse

(57) ABSTRACT

A diamond sintered body having high wear resistance, chipping resistance, shock resistance and thermal conductivity is provided. The diamond sintered body includes sintered diamond particles and a sintering aid as the remainder. The content of the sintered diamond particles is at least 80% by volume and less than 99% by volume. The sintered diamond particles have a particle size in the range from at least 0.1 μm to at most 70 μm. The sintered diamond particles next to each other are directly bonded. The sintering aid includes at least one kind selected from tungsten, iron, cobalt and nickel. The percentage of the tungsten in the sintered body is in the range from at least 0.01% by weight to at most 8% by weight.

9 Claims, No Drawings

DIAMOND SINTERED BODY HAVING HIGH STRENGTH AND HIGH WEAR RESISTANCE, AND TOOL INCLUDING THE SAME

TECHNICAL FIELD

The present invention relates generally to a diamond sintered body having high strength and high wear resistance, and particularly, to a highly strong and highly abrasion-resisting diamond sintered body having high wear resistance, chipping resistance, shock resistance and thermal conductivity, and a tool including the sintered body.

BACKGROUND ART

Diamond is the hardest material present on earth. Particularly, a diamond sintered body hardly suffers from chips caused by the cleavage, a shortcoming of monocrystalline diamond, and therefore is often used as a material for a cutting tool for a nonferrous material such as an aluminum-silicon alloy. Japanese Patent Publication Nos. 39-20483 and 52-12126 for example disclose sintered bodies formed by sintering diamond particles using a ferrous metallic binder such as cobalt.

Among these diamond sintered bodies, those having granules with a diamond particle size of less than 5 $\mu$m or those having extra fine granules with a particle size of at most 1 m are known as highly chipping-resisting materials. Japanese Patent Publication No. 39-20483 for example discloses a diamond sintered body including fine diamond particles and ferrous metal powder which allows diamond to be dissolved and re-precipitated, and Japanese Patent Publication No. 58-32224 for example discloses a diamond sintered body including sintered diamond particles having a particle size of at most 1 $\mu$m, a carbide, a nitride and a boride of a metal belonging to group 4a, 5a or 6a in the periodic table, a solid solution or mixture thereof and a ferrous alloy.

When these fine diamond particles and a ferrous metal such as cobalt or tungsten carbide-cobalt are used as starting materials for sintering, diamond particles could often grow abnormally unless the temperature and pressure conditions are strictly controlled, because such diamond particles are extremely active. Therefore, the size of the diamond particles partly becomes extremely large, which makes it difficult to provide a diamond sintered body having a particle size of at most 1 $\mu$m and a homogeneous microstructure with high yields.

In order to solve this problem, there is known a method of controlling the growth of particles by providing hard particles such as tungsten carbide, cubic boron nitride and silicon carbide at diamond grain boundaries. Japanese Patent Publication No. 61-58432 for example discloses a diamond sintered body formed by adding tungsten carbide as hard particles.

This method however controls abnormal growth of diamond particles by providing hard particles having low compatibility with diamond particles between the diamond particles, thereby physically and chemically preventing direct bonding between the diamond particles, and therefore the formation of skeletons by sintering between the diamond particles is insufficient. As a result, the chipping resistance, shock resistance and thermal conductivity, i.e., essential characteristics of diamond are disadvantageously lowered.

Meanwhile, among various diamond sintered bodies, coarse grained ones having a particle size from at least 5 $\mu$m to at most 100 $\mu$m are generally known as having high wear resistance. Such coarse grained diamond particles are, however, not easily sintered, and therefore a known method forms a carbide on the surface of diamond particles in order to make sintering easier. Japanese Patent Laying-Open No. 63-134565 for example discloses a method of producing a carbide on the surface of diamond particles, thereby enhancing the binding force of a sintering aid metal to individual diamond particles to ease sintering. Many products of diamond sintered body using sintering aid including a tungsten carbide in order to ease sintering are manufactured.

When a carbide is thus generated on the surface of diamond particles, however, the wear resistance, chipping resistance, shock resistance and thermal conductivity are lower than diamond sintered bodies including only diamond particles and a ferrous metal. If a tungsten carbide is added to a sintering aid, the content of the sintering aid increases, which is more likely to deteriorate the wear resistance of the diamond sintered body.

In recent years, harder materials difficult to cut have increased the need for machining tools with a diamond sintered body for cutting these harder materials. As a result, it is required that the sintered body has a wear resistance, a chipping resistance, a shock resistance and a thermal conductivity higher than conventional sintered bodies for making cutting tools.

The present invention is directed to a solution to the above-described problems, and it is an object of the present invention to provide a diamond sintered body having a required wear resistance, chipping resistance, shock resistance and thermal conductivity higher than conventional diamond sintered bodies.

SUMMARY OF THE INVENTION

The inventors have found that the strength such as the chipping and shock resistance, the wear resistance and the thermal conductivity of a diamond sintered body can be improved by strengthening direct bonds between the diamond particles and the chipping. Conventionally hard particles have been used by sintered bodies using granular diamond powder. Such hard particles have a low compatibility with diamond particles in order to restrain the growth of the diamond particles. Methods of restraining grain growth without using such hard particles were considered by the inventors.

As a result, it was found that diamond dissolved in a ferrous metal as a sintering aid at the time of sintering, and as the diamond sintered body cooled down after the sintering, the diamond in the ferrous metal was re-precipitated, which caused abnormal growth of diamond particles. It was then found that in order to prevent this phenomenon, metallic tungsten should be added to the ferrous metal as the sintering aid, which reduced the amount of diamond dissolved in the ferrous metal, which could reduce re-precipitation and prevent diamond particles from growing abnormally. By this method, the use of conventional hard particles is not necessary, diamond particles are more easily bonded with one another, so that a strong skeleton is formed. Furthermore, since the hard particles are not necessary, the content of diamond in the resultant diamond sintered body increases.

In a sintered body using coarse-grained diamond powder, metal tungsten added in a sintering aid makes it easier to sinter the diamond particles. Therefore, the addition of tungsten carbide as conventionally practiced is not necessary, which improves the wear resistance of the diamond sintered body.

It was also found that the wear resistance of the sintered body increased as the content of diamond particles in the diamond sintered body increased.

It was also found that the size of defects in the sintered body was closely related with strength characteristics such as the chipping resistance and shock resistance of the sintered body. The defects herein are diamond particles having an extremely large size in the sintered body, a pool of a sintering aid such as a solvent metal, a fault in the diamond sintered body and the like. The strength of the sintered body increases as defects in the diamond sintered body are reduced.

A high strength and abrasion resistant diamond sintered body according to the present invention is based on the above knowledge and includes sintered diamond particles, a sintering aid and an inevitable impurity as the remainder. The content of the sintered diamond particles is at least 80 vol. % and less than 99 vol. %. The diamond particles have a particle size in the range from at least 0.1 $\mu$m to at most 70 $\mu$m. Sintered diamond particles next to each other are directly bonded. The sintering aid includes at least one kind selected from the group consisting of iron, cobalt and nickel, and metallic tungsten. Herein, the substance represented by the word "tungsten" may be metallic tungsten or a tungsten compound such as tungsten carbide. The content of tungsten in the sintered body is in the range from at least 0.01 wt % to at most 8 wt %.

In such a diamond sintered body, metallic tungsten is added in the sintering aid. As a result, abnormal growth of diamond particles used as a raw material may be restrained without adding hard particles even if the size of the diamond particles is small. Meanwhile, if the size of diamond particles used as a raw material is large, a highly strong diamond sintered body having high chipping resistance, wear resistance, shock resistance and thermal conductivity may be provided by adding metallic tungsten in the sintering aid. Since the amount of the sintering aid to be added is smaller than the conventional cases and the content of diamond is larger, the wear resistance will not be lowered.

The content of sintered diamond particles is set in the range from at least 80% by volume to less than 99% by volume for the following reason. If the content of sintered diamond particles is less than 80 volume %, the strength such as chipping resistance and shock resistance, and the wear resistance are reduced, while the content of diamond particles cannot be technically set to the level equal to or higher than 99% by volume.

The size of sintered diamond particles is set in the range from at least 0.1 $\mu$m to at most 70 $\mu$m for the following reason. If the size of sintered diamond particles is less than 0.1 $\mu$m, the surface area of diamond particles increases, and then a diamond sintered body is more likely to abnormally grow, which reduces the wear resistance of the diamond sintered body. If the particle size exceeds 70 $\mu$m, the cleavage of diamond particles reduces the strength of the diamond sintered body.

The content of tungsten in the sintered body is set in the range from at least 0.01% by weight to at most 8% by weight for the following reason. If the content of tungsten is less than 0.01% by weight, the effect of adding metal tungsten in the sintering aid cannot be obtained. If the content of tungsten exceeds 8% by weight, the content of diamond in the sintered body is reduced, and the diamond dissolved in the sintering aid is too small, resulting in incomplete sintering.

The diamond sintered body includes tungsten carbide, the ratio ($I_{WC}/I_D$) of X-ray diffraction intensity $I_{WC}$ by the plane index (100) or the plane index (101) of the tungsten carbide in the diamond sintered body relative to X-ray diffraction intensity $I_D$ by the plane index (111) of the sintered diamond particles is less than 0.02, the diamond sintered body contains cobalt, and the ratio ($I_{CO}/I_D$) of X-ray diffraction intensity $I_{CO}$ by the plane index (200) of cobalt in the diamond sintered body relative to $I_D$ is preferably less than 0.4.

The diamond sintered body contains nickel, and the ratio ($I_{Ni}/I_D$) of X-ray diffraction intensity $I_{Ni}$ by the plane index (200) of the nickel in the diamond sintered body relative to X-ray diffraction intensity $I_D$ by the plane index (111) of the sintered diamond particles is preferably less than 0.4.

The diamond sintered body contains iron, and the ratio ($I_{Fe}/I_D$) of X-ray diffraction intensity $I_{Fe}$ by the plane index (200) of the iron in the diamond sintered body relative to X-ray diffraction intensity $I_D$ by the plane index (111) of the sintered diamond particles is preferably less than 0.2. Herein, the "X-ray diffraction intensity" refers to the level of a peak in an X-ray diffraction profile using a CuK$\alpha$ radiation (a characteristic X-ray generated by the K-shell of Cu).

The above conditions are defined because if $I_{WC}/I_D$ exceeds 0.02, the amount of tungsten carbide is excessive, which lowers the wear resistance. If the intensity ratio of the intensity by the above ferrous metals are without the above-described ranges, the amount of the ferrous metal in diamond sintered body becomes excessive, which also lowers the wear resistance of the diamond sintered body.

The sintering aid further includes palladium, and the ratio of the palladium in the sintering aid is preferably in the range from at least 0.005 % by weight to at most 40% by weight. In this case, since the palladium is added to the sintering aid, the melting point of the sintering aid is lowered, so that the diamond sintered body may be sintered at low temperatures. The ratio of the palladium is set in the range from at least 0.005% by weight to at most 40% by weight for the following reason. If the ratio of palladium is less than 0.005% by weight, the amount of palladium is not enough for lowing the melting point of the sintering aid, while if the ratio exceeds 40% by weight, the melting point of the sintering aid conversely increases, which makes sintering hard.

The sintering aid further includes at least one kind selected from the group consisting of tin, phosphorus and boron, and the total percentage of tin, phosphorus and boron in the sintering aid is preferably at least 0.01% by weight and at most 30% by weight. In this case, since at least one kind from tin, phosphorus and boron is included in the sintering aid, any of these elements lowers the melting point of the sintering aid. As a result, the diamond powder may be sintered at relatively low temperatures. Herein, the ratio of these elements is set in the range from at least 0.01% by weight to at most 30% by weight for the following reason. If the ratio of these elements is less than 0.01% by weight, the effect of lowering the melting point of the sintering aid is not enough, while if the ratio exceeds 30% by weight, diamond hardly dissolves in the ferrous group metal in the sintering aid at the time of sintering. Thus, the bonds between diamond particles will not be enough, and the strength or thermal conductivity are lowered.

The inventors also noticed oxygen or oxide adsorbed at the surface of diamond powder particles in a raw material for manufacturing a diamond sintered body, and found that removal of oxygen or oxide could reduce defects in the sintered body, and the strength of diamond sintered body could be improved. As a result, the percentage of oxygen in the diamond sintered body is preferably in the range from at least 0.005% by weight to 0.08% by weight, because ratios less than 0.005% by weight cannot be obtained by presently available techniques, while the strength of the diamond sintered body could be the same as conventional cases for a ratio equal to or higher than 0.08% by weight.

Traverse resistance measured at a span of 4 mm, using a measurement test piece having a length of 6 mm, a width of 3 mm and a thickness in the range from at least 0.35 mm to at most 0.45 mm manufactured from a diamond sintered body obtained as described above is preferably in the range from at least 50 kgf/mm$^2$ to 300 kgf/mm$^2$.

Traverse resistance measured at a span of 4 mm, using a test piece manufactured from the diamond sintered body thus obtained and dissolved in fluoro-nitric acid is preferably at least 50 kgf/mm$^2$.

The above-described highly strong and abrasion-resistant diamond sintered body is preferably used as a tool. In this case, the tool including the highly strong and abrasion-resistant diamond sintered body includes sintered diamond particles, and a sintering aid and an inevitable impurity as the remainder. The content of the sintered diamond particles is in the range from at least 80% volume by volume to less than 99% by volume. The sintered diamond particles have a particle size in the range from at least 0.1 $\mu$m to at most 70 $\mu$m. Sintered diamond particles next to each other are directly bonded. The sintering aid includes at least one kind selected from the group consisting of iron, cobalt and nickel, and metallic tungsten. The content of the tungsten in the sintered body is in the range from at least 0.01% by weight to at most 8% by weight.

In order to provide a diamond sintered body according to the present invention, a sintering aid is homogeneously distributed in the sintered diamond particles and does not contain unnecessary components. As a method of coating particles included in diamond powder with a sintering aid in view of the above points, CVD (Chemical Vapor Deposition) methods and PVD (Physical Vapor Deposition) methods or solution precipitation methods may be employed.

Furthermore, since homogeneously distributing of the sintering aid coating the surface of diamond particles is significantly important for improvements in the difficulty of sintering diamond powder and the strength of the diamond sintered body according to the present invention, and the method should be highly economical, an electroless plating disclosed in Japanese Patent Laying-Open No. 8-225875 by the inventors may be most preferably employed.

BEST MODE FOR CARRYING OUT THE INVENTION

First Embodiment

Manufacture of Diamond Sintered Body

Different kinds of diamond powder having different particle sizes and sintering aids having different components (IA to IH) given in Table 1 were prepared. Sintering aids 1A, 1B, 1E and 1F were added to diamond powder by eletroless plating, sintering aids 1C and 1G by ultrafine particle powder mixing, and sintering aids 1D and 1H by cemented carbide ballmilling. For the ultrafine powder mixing, ultrafine cobalt powder having a particle size of at most 0.5 $\mu$m and diamond powder were placed in a container formed of Teflon to have a prescribed composition, and then Teflon balls were placed in the container, and then they were mixed for three hours to manufacture a powder sample. For the cemented carbide ballmilling, diamond powder, tungsten carbide powder and cobalt powder were placed in a container formed of tungsten carbide-cobalt together with tungsten carbide-cobalt balls for mixing for a prescribed time period. The time for mixing was controlled to manufacture sample powder having a prescribed sintering aid composition. The samples by these methods are given in Table 1.

TABLE 1

| Sample No. | Diamond Powder Particle Size ($\mu$m) | Method of Adding Sintering Aid | Content of Sintering Aid (% by vol) | Composition of Sintering Aid (% by wt) |
|---|---|---|---|---|
| 1A | 0.1 ~ 4 | electroless plating | 7.0 | 90.85 Co, 5.0 W, 4.0 Fe, 0.05 Pd, 0.10 Sn |
| 1B | 0.1 ~ 4 | electroless plating | 25.0 | 90.85 Co, 5.0 W, 4.0 Fe, 0.05 Pd, 0.10 Sn |
| 1C | 0.1 ~ 4 | ultrafine particle powder mixing | 7.0 | 100 Co |
| 1D | 0.1 ~ 4 | cemented carbide ballmill | 7.0 | 25 Co, 75 Wc, |
| 1E | 0.1 ~ 60 | electroless plating | 7.0 | 90.85 Co, 5.0 W, 4.0 Fe, 0.05 Pd, 0.10 Sn |
| 1F | 0.1 ~ 60 | electroless plating | 25.0 | 90.85 Co, 5.0 W, 4.0 Fe, 0.05 Pd, 0.10 Sn |
| 1G | 0.1 ~ 60 | ultrafine particle powder mixing | 7.0 | 100 Co |
| 1H | 0.1 ~ 60 | cemented carbide ballmill | 7.0 | 25 Co, 75 WC, |

The "Composition of sintering aid" in Table 1 refers to the percentage of each component in the sintering aid. For example, in the case labeled "90.85 Co", 90.85% by weight of the sintering aid is cobalt.

Samples 1A to 1D were heat-treated at 1300° C. for 60 minutes, and 1E to 1H were heat-treated at 1500° C. for 60 minutes. Samples 1A to 1H were each placed in a tantalum container, and sintered under a pressure of 55 kb, at a temperature of 1450° C. using a belt type ultra high pressure apparatus to provide a diamond sintered body.

Evaluation of Diamond Sintered Body

Measurement of Diffraction Intensity Ratio

The diamond sintered body obtained by the above process was subjected to X-ray diffraction an electron beam at an acceleration voltage of 40 kV directed to a copper target, at a current of 25 mA, at a diffraction angle 2θ in the range from 20° to 80°, and at a scanning speed of 0.1°/sec, using a CuKα radiation (a characteristic X-ray generated by the K-shell of Cu). As a result, the levels (of intensity) $I_{WC}$, $I_D$, and $I_{CO}$ of diffraction peaks of the plane index (101) of tungsten carbide, the plane index (111) of diamond, and the plane index (200) of cobalt were measured.

Measurement of Strength

Evaluation of Cutting Performance

A tool for cutting is manufactured using the sintered body, and the cutting performance was evaluated under the following condition.

Workpiece: Al-16% by weight Si alloy round bar

The rotating speed of the surface of the workpiece: 700 m/min

Depth of cut: 0.5 mm

Feed rate: 0.15 mm/rev

Cutting time: 5 min

Confirming the Presence of Metallic Tungsten

Samples to be observed by a transmission electron microscope were manufactured from the obtained sintered bodies, observed in a plurality of arbitrary fields of view, and the presence/absence of metallic tungsten was determined based on the electron diffraction pattern. The result is given in Table 2.

TABLE 2

| Sample No. | X-ray Diffraction Intensity Ratio (%) | | Strength (kgf/mm²) | | W Content (% by wt) | Diamond Content (% by vol) | Flank Wear Width (μm) | Metallic Tungsten |
|---|---|---|---|---|---|---|---|---|
| | $I_{WC}/I_D$ | $I_{CO}/I_D$ | Before Treated | After Treated | | | | |
| 1A | 0.1 | 31 | 256 | 142 | 4.1 | 86 | 81 | ○ |
| 1B | 0.9 | 45 | 210 | 117 | 4.5 | 80 | 103 | ○ |
| 1C | | | Sintering not possible | | | | | |
| 1D | | | Sintering not possible | | | | | |
| 1E | 0.1 | 17 | 121 | 82 | 1.7 | 96 | 66 | ○ |
| 1F | 0.2 | 25 | 103 | 71 | 1.9 | 91 | 73 | ○ |
| 1G | 1.8 | 28 | 87 | 59 | 2.1 | 83 | Chipping | X |
| 1H | 12 | 31 | 95 | 68 | 6.2 | 88 | 79 | X |

○: metallic tungsten present
X: absent

A plurality of rectangular parallelepiped test pieces having a length of 6 mm, a width of 3 mm, and a thickness of 0.4 mm were cut from each diamond sintered body. The strength (transverse rupture strength) of the sintered body was measured by a three-point bending test at a span distance of 4 mm for these samples. The samples were placed in a fluoronitric acid solution produced by mixing 40 ml nitric acid of a molarity of 30% and 10 ml hydrogen fluoride of a molarity of 45%. These samples were each placed in a sealed container, maintained at 130° C. for three hours for dissolution. The strength (transverse rupture strength) of the sintered bodies was measured by a three-point bending test at a span distance of 4 mm for the samples subjected to and not subjected to the dissolution treatment.

Measurement of W Content

The total contents of metallic tungsten (W) and tungsten carbide relative to the weight of the diamond sintered body were measured by plasma emission spectrochemical analysis.

Measurement of Diamond Content

The surface of the diamond sintered body was observed using a microscope, and the region of diamond particles was measured to determine the diamond content in the sintered body.

The "W content" in Table 2 represents the percentage by weight of tungsten (metallic tungsten and tungsten carbide in total) in the sintered body. The presence and absence of metallic tungsten observed by the transmission electron microscope was represented by "○" and "×" in the Table.

As can be seen from Table 2, products 1A and 1E according to the present invention show good performances both in the strength and flank wear.

Meanwhile, for 1C and 1D, the sintering aid was insufficient in amount and heterogeneously distributed, and therefore the dissolution of the sintering aid did not occur homogeneously within the powder diamond, so that a complete sintered body was not obtained.

It was observed that the sintering aid was heterogeneously distributed in the microstructure of the sintered body 1G, which caused chipping in the tool while cutting, and the tool could no longer be used.

As a result, products 1A and 1E according to the present invention provided higher strength, a smaller flank wear width and higher chipping resistance than conventional products 1D and 1H, and would show better performance as a good cutting tool. As a result of the observation with the microscope, sintered diamond particles next to each other were directly bonded.

Second Embodiment

Experiments to compare the characteristic of sintered bodies depending upon the particle sizes of diamond particles were performed. Several diamond powder samples having various particle sizes was prepared. A sintering aid was added to the diamond powder by an electroless plating such that the ratio of the diamond powder is 93% by volume and the ratio of a sintering aid having a prescribed position is 7% by volume, then heat treated, and diamond sintered bodies were manufactured according to the same method as the first embodiment.

The strength and flank wear width of the diamond sintered bodies were measured according to the method the same as the first embodiment. The result is given and Table 3.

higher shock resistance. Meanwhile, a sample with a larger particle size, in other words, a sample with coarse particles (2B) has a smaller width of flank wear, and has higher wear resistance. In 2C, the diamond particle size was so large that chipping was caused during cutting and the cutting test could not be continued.

Third Embodiment

Experiments about characteristics of sintered bodies depending upon the amount of metallic tungsten added in the sintering aid were performed. Several diamond powder samples having various particle sizes were prepared. Sintering aids having various ratios of tungsten were added to diamond powder samples by electroless plating, and sub-

TABLE 3

| Sample No. | Diamond Power Particle Size (μm) | Diamond Content (% by vol) | Composition of Sintering Aid (% by wt.) | Strength (kgf/mm²) | Flank Wear Width (μm) | $I_{WC}/I_D$ | W Content (% by wt) | Metallic Tungsten |
|---|---|---|---|---|---|---|---|---|
| 2A | 0.1 ~ 4 | 83 | 94.85 Co, 5.0 W, 0.05 Pd, 0.10 Sn | 238 | 91 | 0.5 | 4.3 | ○ |
| 2B | 0.1 ~ 60 | 93 | 94.85 Co, 5.0 W, 0.05 Pd, 0.10 Sn | 105 | 67 | 0.2 | 2.1 | ○ |
| 2C | 20 ~ 100 | 96 | 94.85 Co, 5.0 W, 0.05 Pd, 0.10 Sn | 45 | chipping | 0.1 | 1.2 | ○ |

○: metallic tungsten present
X: absent

In a product 2A, the content of diamond was reduced, because much diamond was dissolved in the sintering aid, while in 2C, the sintering aid flowed out, and therefore the content of diamond increased. As can be seen from Table 3, a sample with a smaller diamond particle size, in other words, a finer sample (2A) has higher strength, and therefore jected to heat treatment, followed by sintering according to the method the same as the first embodiment to obtain diamond sintered bodies. For the obtained diamond sintered bodies, the strength and flank wear width were measured according to the method the same as the first embodiment. The result is given in Table 4.

TABLE 4

| Sample No. | Diamond Particle Size (μm) | Composition of Sintering aid (% by wt) | Diamond Content (% by vol) | Strength (kgf/mm²) | Flank Wear Width (μm) | W Content (% by wt) | $I_{WC}/I_D$ | Metallic Tungsten |
|---|---|---|---|---|---|---|---|---|
| 3A | 0.1 ~ 4 | 90.85 Co, 5.0 W, 4.0 Fe, 0.05 Pd, 0.10 Sn | 86 | 256 | 81 | 4.1 | 0.1 | ○ |
| 3B | 0.1 ~ 4 | 80.85 Co, 15.0 W, 4.0 Fe, 0.05 Pd, 0.10 Sn | 79 | 186 | 110 | 13.4 | 2.1 | ○ |
| 3C | 0.1 ~ 4 | 95.85 Co, 4.0 Fe, 0.05 Pd, 0.10 Sn | Abnormal Grain growth | | | | | |
| 3D | 0.1 ~ 60 | 90.85 Co, 5.0 W, 4.0 Fe, 0.05 Pd, 0.10 Sn | 96 | 121 | 66 | 1.7 | 0.1 | ○ |
| 3E | 0.1 ~ 60 | 80.85 Co, 15.0 W, 4.0 Fe, 0.05 Pd, 0.10 Sn | 90 | 103 | 85 | 8.2 | 1.7 | ○ |
| 3F | 0.1 ~ 60 | 95.85 Co, 4.0 Fe, 0.05 Pd, 0.10 Sn | Partly not sintered | | | | | |

○: metallic tungsten present
X: absent

Samples 3A and 3D in Table 4 are diamond sintered bodies manufactured from the same powder as samples 1A and 1E manufactured according to the first embodiment. Samples 3B, 3C, 3E and 3F were produced by changing the amount of metallic tungsten added in the sintering aid.

It is appreciated that when the amount of tungsten in the sintering aid exceeds 8% by weight like samples 3B and 3E, the "strength" is small while the "width of flank wear" is large, and therefore the strength or wear resistance is lowered. For samples 3C and 3F without adding metallic tungsten, sintering was often incomplete and sintered body was not stably obtained. It is appreciated that samples 3A and 3D in which the amount of tungsten added in the sintered bodies is at least 0.01% by weight and at most 8% by weight have high strength and wear resistance.

Fourth Embodiment

Experiments were performed about the effect of the amount of palladium added in the sintering aid on the stability of obtaining complete sintered body. Several diamond powder samples having various particle sizes were prepared. The powder samples were formed by adding a sintering aid containing tungsten and palladium in various ratios, iron in 4.0% by weight, and tin in 0.1% by weight with the remainder of cobalt. These samples were maintained at a temperature of 1450° C. under a pressure of 50 kb for 20 minutes, using a belt type ultra high pressure apparatus. The result is given is Table 5.

TABLE 5

| W Content (% by wt) | Pd Content (% by wt) | Diamond Powder Particle Size (μm) | | |
|---|---|---|---|---|
| | | 0.1 ~ 1 | 1 ~ 2 | 5 ~ 10 |
| 4.0 | — | ○ (3.8) | ○ (3.5) | ○ (2.9) |
| 4.0 | 0.02 | ○ (3.7) | ○ (3.2) | ○ (2.5) |
| — | 0.02 | Δ (particle growth) | ○ | ○ |
| — | — | × | × | ○ |

Parenthesized numbers each represent the content of tungsten (% by wt).

The "○" in Table 5 indicates that the powder sample was sintered and the particles did not grow abnormally. The "Δ (particles growth)" indicates that the powder sample was sintered but part of the diamond particles grew abnormally. The "×" indicates that the powder sample was not completely sintered. For the samples with addition of metallic tungsten, the result of analysis of the content of tungsten in the sintered body is indicated in parentheses in the table. As can be seen from Table 5, in a sample including only tungsten and a sample including tungsten and palladium, the sintering was surely performed. In a sample without tungsten and including palladium, the sintering was performed to a certain extent, but the sintering was not performed sufficiently if fine diamond powder was used. This shows that the sintering is easily performed if the content of palladium is at least 0.01% by weight and at most 40% by weight, which is the range according to the present invention.

Fifth Embodiment

Experiments were performed about characteristics of sintered bodies produced with an additional sintering aid. Several diamond powder samples having a particle size in the range from 0.1 to 30 μcm were prepared. The diamond powder samples were subjected to degreasing and acid cleaning in order to add a sintering aid by electroless plating. The diamond powder samples were immersed in a cold solution containing palladium chloride, stannous chloride and hydro-chloric acid for two minutes at room temperature as a pre-treatment. Subsequently, the diamond powder samples were immersed in a sulfuric acid aqueous solution for two minutes. Then, the samples were washed with water, and then immersed in a Ni-B aqueous solution for plating at a temperature of 90° C. containing nickel chloride and sodium boron hydroxide for two minutes to provide diamond powder samples coated with the sintering aid.

After the diamond powder samples were compressed for shaping, a metal plate and as an additional sintering aid having a composition given in Table 6 and the compact were layered and enclosed in a tantalum container.

TABLE 6

| Sample No. | Diamond Powder Particle Size (μm) | Amount of Sintering Aid for Coating (% by vol) | Composition of Sintering Aid (% by wt) | Composition of Additional Sintering Aid (% by wt) |
|---|---|---|---|---|
| 4A | 0.1 ~ 30 | 0.1 | 87.0 Ni, 7.0 Pd, 5.0 W, 1.0 Sn | 100 Ni |
| 4B | 0.1 ~ 30 | 0.1 | 87.0 Ni, 7.0 Pd, 5.0 W, 1.0 Sn | 98 Ni, 2.0 B |
| 4C | 0.1 ~ 30 | 0.1 | 87.0 Ni, 7.0 Pd, 5.0 W, 1.0 Sn | 89 Ni, 11 B |
| 4D | 0.1 ~ 30 | 0.1 | 87.0 Ni, 7.0 Pd, 5.0 W, 1.0 Sn | 79 Ni, 21 B |
| 4E | 0.1 ~ 30 | 0.1 | 87.0 Ni, 7.0 Pd, 5.0 W, 1.0 Sn | 66 Ni, 34 B |

The "composition of additional sintering aid" in Table 6 is the composition of the metal plate. The "amount of sintering aid for coating" represents the ratio of the sintering aid in the diamond sintered body in percentage by volume.

Subsequently, the tantalum container was maintained at a temperature of 1550° C. and under a pressure of 60 kb for 10 minutes using a girdle type ultra high pressure apparatus. As a result, each diamond sintered body was produced.

Each of the sintered bodies was processed into a test piece having a length of 6 mm, a width of 3 mm and a thickness of 0.3 mm, followed by three-point bending test at a span distance of 4 mm to evaluate the strength. The result is given in Table 7.

TABLE 7

| Sample No. | Diamond Content (% by vol) | Total Content of Sn and B in Sintering Aid (% by wt) | Strength (kgf/mm$^2$) |
|---|---|---|---|
| 4A | 94 | 0.005 | 88 |
| 4B | 94 | 1.99 | 118 |
| 4C | 94 | 11.0 | 105 |
| 4D | 94 | 20.9 | 94 |
| 4E | 94 | 33.8 | 72 |

As can be seen from Table 7, the strengths of 4B, 4C and 4D are higher than those of 4A and 4E.

More specifically, the total content of tin, phosphorus and boron in a sintering aid is preferably at least 0.01% by weight and at most 30% by weight. When the same experiments were performed with a sintering aid containing tin, phosphorus and boron, it was found that the total content of these substances was preferably at least 0.01% by weight and at most 30% by weight.

Sixth Embodiment

Experiments were performed about characteristics of diamond sintered bodies while the heat treatment temperature of the diamond powder samples was varied. Products 1A and 1E produced according to the first embodiment were heat-treated under various conditions. Then, diamond sintered bodies were produced by sintering the powder subjected to the heat treatment under the conditions the same as those of the first embodiment. The strength of the diamond sintered bodies was measured according to the same method as that in the first embodiment, and the content of oxygen in the sintered bodies were measured by plasma emission spectrochemical analysis. The result is given in Table 8.

TABLE 8

| Sample No. | Heat Treatment Condition | Strength (kgf/mm$^2$) | Oxygen Content (% by wt) |
| --- | --- | --- | --- |
| 5A-1 | 1300° C., 60 min | 256 | 0.025 |
| 5A-2 | 1200° C., 60 min | 207 | 0.110 |
| 5A-3 | 1100° C., 60 min | 184 | 0.143 |
| 5E-1 | 1500° C., 60 min | 121 | 0.009 |
| 5E-2 | 1400° C., 60 min | 105 | 0.015 |
| 5E-3 | 1300° C., 60 min | 88 | 0.022 |

In Table 8, samples 5A-1 to 5A-3 were obtained by using the first powder example 1A shown in Table 1. Samples 5E-1 to 5E-3 were obtained by using the powder example 1E of Table 1. Table 8 shows that the amount of oxygen remaining in the sintered body tends to decrease and therefore the strength of the sintered body increases as the heat treatment temperature is raised.

Note that it was appreciated from another experiment that powder sample 1A was not appropriately used, because the surface of the diamond powder was extremely graphitized when heat-treated at a high temperature equal to or higher than 1400° C., which causes graphite to remain in the resultant sintered body so that the sintering and cutting performance were lowered.

Seventh Embodiment

A diamond powder sample having a particle size in the range from 0.1 to 15 μm was prepared, and a sintering aid identical to that added to powder samples 1A according to the first embodiment was added, followed by heat treatment at 1300° C. in a vacuum. Subsequently, the powder after the heat treatment was filled within a container of an alloy containing tungsten carbide in 10% by weight and having an outer diameter of 20 mm, an inner diameter of 12 mm and a height of 18 mm, followed by sintering at a high pressure and high temperature conditions. Wire drawn dies having a line size diameter of 3 mm were manufactured from the resultant sintered body. The dies was used for a wire drawing test for a copper-plated steel wire at a speed of 500 m/min, with a water-soluble lubricant. As a result, an 80 ton-steel wire was produced by wire drawing, and the surface of the wire was fine.

Eighth Embodiment

Diamond sintered bodies 1A and 1E according to the first embodiment were used to manufacture a circular throw-away tip having a diameter of 13.2 mm and a thickness of 3.2 mm, and a round bar of granite having a compression strength of 1500 kg/cm$^2$ was cut by a general purpose lathe under the following conditions:

The rotating speed of the surface of workpiece to be cut: 180 m/min

Depth of cut: 0.5 mm

Feed rate: 0.25 mm/rev

Cutting time: 3 min

As a result, no chipping was observed in diamond sintered body 1A, and the flank abrasion width was above 0.5 mm. Meanwhile, in diamond sintered body 1E, chipping as large as 0.03 mm was observed at the cutting edge, while the flank wear width was as small as 0.1 mm, which is small enough for the cutting test to be continued.

When a tool manufactured from a conventional diamond sintered body was used for cutting, the cutting resistance increases by abrasion at the time point after cutting for about 2 minutes, abnormal noises were heard during cutting, and therefore the cutting could not be continued. Extreme flank wear was observed in the used tool, and there was a cracking reaching to the cemented carbide which supports the diamond sintered body.

When the diamond sintered body according to the present invention was applied to a drill bit tool which required shock resistance, good results were brought about.

Ninth Embodiment

Several diamond powder samples having a particle size in the range from 0.1 to 60 μm were provided with a sintering aid containing cobalt, tungsten, iron and palladium in various percentages by electroless plating, followed by a heat treatment and then sintering. The obtained various sintering bodies were subjected to X-ray diffraction as is the case with the first embodiment, the diffraction intensity $I_{Ni}$ by the plane index (200) of nickel, the diffraction intensity $I_{Fe}$ by the plane index (200) of iron and the diffraction intensity $I_D$ by the plane index (111) of diamond particles were measured and the ratios $I_{Ni}/I_D$ and $I_{Fe}/I_D$ were obtained. The strength and flank abrasion width of each of the sintered bodies was checked similarly to the first embodiment.

As a result, the samples with $I_{Ni}/I_D$ of less than 0.4 or $I_{Fe}/I_D$ less than 0.4 had high strength and a small width of flank wear.

INDUSTRIAL APPLICABILITY

A highly strong and highly abrasion-resistant diamond sintered body according to the present invention may applied to cutting tools such as a milling cutter, and an end mill, abrasion-resistant tools such as wire drawn dies, and shock-resisting parts such as a golf club head and a shock type power grinding jig.

What is claimed is:

1. A high strength and high wear resistance diamond sintered body comprising sintered diamond particles having a particle size in the range of 0.1 μm to 70 μm, said sintered diamond particles being present in said diamond sintered body within the range of at least 80% by volume to less than 99% by volume, wherein said sintered diamond particles are directly bonded to one another, said diamond sintered body further comprising oxygen within the range of at least 0.005% by weight to less than 0.08% by weight, at least one of metallic tungsten and a tungsten compound within the range of at least 0.01% by weight to at most 8% by weight, and at least one sintering aid selected from the group consisting of iron, cobalt and nickel, said sintered diamond body further comprising unavoidable impurities as a remainder.

2. The diamond sintered body of claim 1, comprising cobalt having an X-ray diffraction intensity $I_{CO}$ relative to a plane index (200) of said cobalt, said diamond sintered body further comprising tungsten carbide having an X-ray diffraction intensity $I_{WC}$ relative to a plane index (100 or 101) of said tungsten carbide, said sintered diamond particles having an X-ray diffraction intensity $I_D$ relative to a plane index (111) of said sintered diamond particles, wherein a first ratio of $I_{WC}$ to $I_D$ is less than 0.02, and wherein a second ratio of $I_{CO}$ to $I_D$ is less than 0.4.

3. The diamond sintered body of claim 1, comprising nickel having an X-ray diffraction intensity $I_{Ni}$ relative to a plane index (200) of said nickel, wherein said sintered diamond particles have an X-ray diffraction intensity $I_D$ relative to a plane index (111) of said sintered diamond particles, and wherein a ratio of $I_{Ni}$ to $I_D$ is less than 0.4.

4. The diamond sintered body of claim 1, comprising iron having an X-ray diffraction intensity $I_{Fe}$ relative to a plane index (200) of said iron, wherein said sintered diamond particles have an X-ray diffraction intensity $I_D$ relative to a plane index (111) of said sintered diamond particles, and wherein a ratio of $I_{Fe}$ to $I_D$ is less than 0.2.

5. The diamond sintered body of claim 1, further comprising palladium as part of said sintering aid, said palladium being present in said sintering aid within a range of at least 0.005% by weight to at most 40% by weight of said sintering aid.

6. The diamond sintered body of claim 1, further comprising, as part of said sintering aid, at least one element selected from the group consisting of tin, phosphorus, and boron, and wherein the total percentage of said tin, phosphorus and boron in said sintering aid is within the range of at least 0.01% by weight to at most 30% by weight of said sintering aid.

7. The diamond sintered body of claim 1, having a transverse rupture strength within the range of at least 50 kgf/mm$^2$ to at most 300 kgf/mm$^2$ as measured on a test piece at a span of 4 mm, said test piece having a length of 6 mm, a width of 3 mm and a thickness within the range of at least 0.35 mm to at the most 0.45 mm.

8. The diamond sintered body of claim 7, wherein said transverse rupture strength as measured at said span of 4 mm is at least 50 kgf/mm$^2$ using a test piece dissolved by a fluoro-nitric acid.

9. A tool made of a diamond sintered body as defined in claim 1.

* * * * *

UNITED STATES PATENT AND TRADEMARK OFFICE
CERTIFICATE OF CORRECTION

PATENT NO. : 6,261,329 B1 Page 1 of 1
DATED : July 17, 2001
INVENTOR(S) : Ogata et al.

It is certified that error appears in the above-identified patent and that said Letters Patent is hereby corrected as shown below:

Column 1,
Line 30, after "most", replace "m" by -- µm --.

Column 6,
Table 1, Col. 5, under the heading "Composition of Sintering Aid (% by Wt.", line 6, replace "25 Co. 75 Wc" by -- 25 Co. 75 WC --.

Signed and Sealed this

Fifteenth Day of January, 2002

*Attest:*

JAMES E. ROGAN
*Attesting Officer* *Director of the United States Patent and Trademark Office*